(12) United States Patent
Nozoe

(10) Patent No.: US 6,345,533 B1
(45) Date of Patent: Feb. 12, 2002

(54) ANGULAR RATE SENSOR

(75) Inventor: Toshiyuki Nozoe, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/485,665

(22) PCT Filed: Jun. 11, 1999

(86) PCT No.: PCT/JP99/03151

§ 371 Date: Apr. 21, 2000

§ 102(e) Date: Apr. 21, 2000

(87) PCT Pub. No.: WO99/66288

PCT Pub. Date: Dec. 23, 1999

(30) Foreign Application Priority Data

Jun. 16, 1998 (JP) ............................................ 10-167873

(51) Int. Cl.[7] ................ G01P 3/44; G01P 9/04
(52) U.S. Cl. .................... 73/504.12; 73/504.16
(58) Field of Search .................... 73/504.12, 504.13, 73/504.14, 504.15, 504.16; 310/316, 319, 317

(56) References Cited

U.S. PATENT DOCUMENTS

| 5,551,292 A | * | 9/1996 | Terajima et al. | ......... 73/504.12 |
| 5,703,292 A | * | 12/1997 | Ward | ................. 73/504.16 |
| 5,794,080 A | * | 8/1998 | Watanabe et al. | ....... 73/504.12 |

FOREIGN PATENT DOCUMENTS

| JP | 9-281138 | 10/1997 |
| JP | 10-232132 | 9/1998 |

* cited by examiner

*Primary Examiner*—Helen Kwok
(74) *Attorney, Agent, or Firm*—Ratner & Prestia

(57) ABSTRACT

An angular rate sensor is capable of restraining an output voltage of the sensor from being offset by suppressing a current flowing in and out of a common terminal so as to prevent it from flowing in and out of a side of a reference voltage generator. The angular rate sensor is provided with a buffer between a reference voltage generator and a support pin, which serves as a common terminal for a vibration exciter, a detector for detecting a level of vibrations, and a detector for detecting a Coriolis' force. A current flowing in and out of the support pin is prevented from flowing in and out of a side of the reference voltage generator.

2 Claims, 4 Drawing Sheets

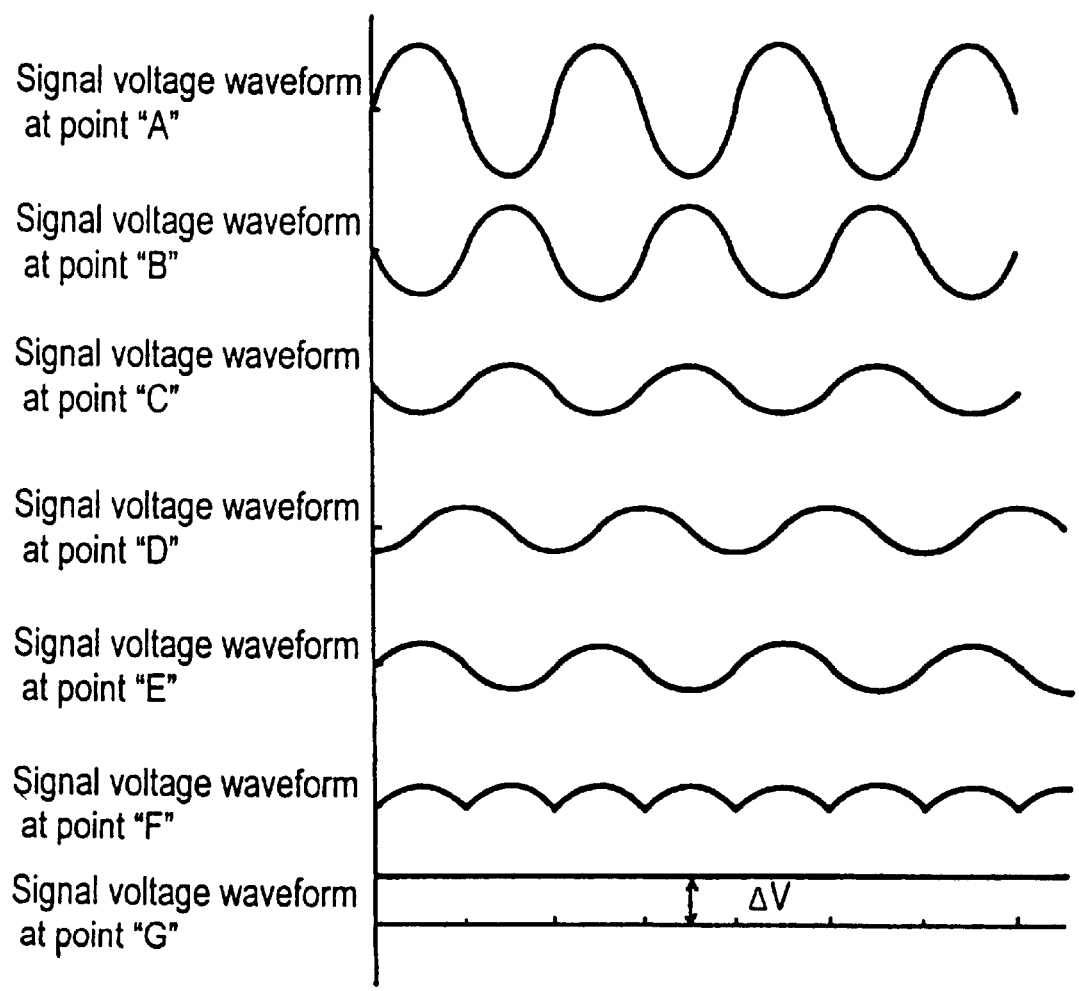

… (US 6,345,533 B1)

ANGULAR RATE SENSOR

This Application is a U.S. National Phase Application of PCT International Application PCT/JP99/03151.

FIELD OF THE INVENTION

The present invention relates to an angular rate sensor.

BACKGROUND OF THE INVENTION

FIG. 3 shows an example of angular rate sensors proposed in the past. In FIG. 3, a support pin 101 made of metal is press-fitted perpendicularly and secured in a weight plate (not shown in the figure), and one end of another support pin 102 also made of metal is press-fitted and secured in the support pin 101 in an orthogonal direction to it. A block 103 made of metal is fixed by soldering at the other end of the support pin 102, which also serves as a common terminal. Vibration plates 104 and 105 are fixed at both ends of the metal block 103. A piezoelectric element 106 is bonded on the vibration plate 104 to constitute a vibration exciter 150, and another piezoelectric element 107 is bonded on the vibration plate 105 to constitute a means 160 for detecting a level of vibrations. A tip of the vibration plate 104 is extended in a manner to form a right angle with the piezoelectric element 106 to become a detecting plate 108. A tip of the vibration plate 105 is also extended in the same manner to form a right angle with the piezoelectric element 107 to become another detecting plate 109. Piezoelectric elements 110 and 111 are bonded respectively on the detecting plates 108 and 109, to constitute detecting means 170 and 180 for detecting a Coriolis' force generated in proportion to an angular rate. All of the above complete an element unit 112 of a tuning-fork type angular rate sensor.

A structure of FIG. 3 further comprises;

(a) a current amplifier circuit 120 for amplifying an output signal from the piezoelectric element 107 provided on the vibration plate 105 to detect a level of vibrations of the vibration plate 105, which vibrates in a tuning-fork phenomenon in concert with vibrations of the vibration plate 104;

(b) a full-wave rectifier circuit 122 for producing a D.C. voltage by rectifying an output signal (i.e. a signal at a point "A", of which a signal voltage waveform is shown in FIG. 4) of a band-pass filter circuit (hereinafter referred to as "BPF circuit") 121, wherein an output signal of the current amplifier circuit 120 is input;

(c) an automatic gain control circuit (hereinafter referred to as "AGC") 123 whose amplification factor for the output signal of the BPF circuit 121 varies according to a magnitude of an output signal of the full-wave rectifier circuit 122;

(d) a driver circuit 124 (an output signal of this circuit, i.e. a signal at a point "B", has a voltage waveform shown in FIG. 4) for driving the piezoelectric element 106 bonded on the vibration plate 104 according to a magnitude of an output signal of the AGC 123;

(e) a charge amplifier circuit 125 for inputting and amplifying output signals of the piezoelectric elements 110 and 111, which detect a Coriolis' force generated in proportion to an angular rate;

(f) a synchronous detection circuit 127 for detecting an output signal of a BPF circuit 126, wherein an output signal of the charge amplifier circuit 125 is input; and (g) a sensor output terminal 129 for outputting an output signal of a low-pass filter circuit (hereinafter referred to as "LPF circuit") 128, wherein an output signal of the synchronous detection circuit 127 is input.

In addition, a reference voltage generating means 132 comprises a power supply 130 and a buffer 131. The reference voltage generating means 132 supplies a reference voltage to each of the above-cited circuits through a circuit resistance 133 (let a resistance value be "R1").

A terminal 135 is also provided for connecting the reference voltage generating means 132 to the support pin 102 via the circuit resistance 133 and another circuit resistance 134 (let a resistance value be "R2"). The foregoing elements constitute a driving circuit 136.

The element unit 112 of a tuning-fork type angular rate sensor and the driving circuit 136 complete the angular rate sensor.

In the prior art technique, an alternate current "i" flows from the driver circuit 124 toward the reference voltage generating means 132 via the terminal 135 by passing through the vibration exciter 150 at all the time, even in an ordinary vibrating condition of the tuning fork.

In addition, a demand for reduction in size of the angular rate sensors necessitates an integration of the driving circuit 136 into an IC tip form. This consequently reduces a width of wiring pattern, which in turn increases resistance values of the individual circuit resistances 133 and 134.

Ripple voltage of a large magnitude defined by (R1+R2)·i is therefore generated between the circuit resistances 133 and 134 (this ripple voltage is observed at a point "C", and a waveform of the signal voltage is shown in FIG. 4).

The ripple voltage subsequently causes a substantial difference between the reference voltage input to individual circuits and the voltage at the terminal 135. A displacement current flows as a result (this displacement current is observed at a point "D", of which a signal current waveform is shown in FIG. 4) from the piezoelectric elements 110 and 111. This displacement current is input in the charge amplifier circuit 125, and an output signal voltage of it appears at a point "E" (a waveform of the signal voltage is shown in FIG. 4). However, this signal voltage turns into an output signal of the synchronous detection circuit 127 and appears at a point "F" (a waveform of this signal voltage is shown in FIG. 4) without being cut off in a process of synchronous detection, since it is in a same phase as the waveform of the signal voltage at the point "A", i.e. a timing signal, of the synchronous detection circuit 127. This output signal eventually becomes an offset voltage (this offset voltage is observed at a point "G", as shown in FIG. 4), and it comes out at the output terminal 129. This offset voltage denoted as $\Delta V$ is given by a formula (1):

$$\Delta V = A \cdot D \cdot (R1+R2) \cdot i \cdot (1/C0) \cdot (Cs1+Cs2) \cdot \sin \phi \qquad (1),$$

where:

A is a gain of the low-pass filter and the band-pass filter;

D is a detection coefficient;

C0 is a feedback capacity of the charge amplifier, in pF; and

Cs1 and Cs2 are electrostatic capacities of the piezoelectric elements 110 and 111, in pF.

In addition, it is likely that a variation occurs with the reference voltage input to the individual circuits, since ripple voltage of a large magnitude defined by R1·i is generated in the circuit resistance 133.

SUMMARY OF THE INVENTION

An angular rate sensor of the present invention comprises:

(a) a vibration exciter for providing a vibration body with vibrations;

(b) a means for detecting a level of vibrations of the vibration body;

(c) a detecting means for detecting a Coriolis' force produced in proportion to an angular rate;

(d) a current amplifier circuit for amplifying an output signal of the means of detecting a level of vibrations;

(e) a full-wave rectifier circuit for producing a D.C. voltage by rectifying an output signal of a band-pass filter circuit, wherein an output signal of the current amplifier circuit is input;

(f) an automatic gain control circuit whose amplification factor for the output signal of the band-pass filter circuit varies according to a magnitude of an output signal of the full-wave rectifier circuit;

(g) a driver circuit for driving the vibration exciter in accordance with a magnitude of an output signal of the automatic gain control circuit;

(h) a charge amplifier circuit for inputting and amplifying a signal detected by the detecting means for detecting a Coriolis' force;

(i) a synchronous detection circuit for detecting an output signal of a band-pass filter circuit, wherein an output signal of the charge amplifier circuit is input;

(j) a sensor output terminal for outputting an output signal of a low-pass filter circuit, wherein an output signal of the synchronous detection circuit is input;

(k) the reference voltage generating means; and (l) a buffer provided between the reference voltage generating means and the common terminal for the vibration exciter, the means for detecting a level of vibrations and the detecting means for detecting a Coriolis' force, for suppressing a current flowing in and out of the common terminal so as to avoid it from flowing in and out of a side of the reference voltage generating means. This structure can realize the angular rate sensor capable of restraining the output voltage of the sensor from being offset.

BRIEF DESCRIPTION OF THE DRAWINGS

FIG. 4 is a graphical representation of signal waveforms at various points in the same angular rate sensor.

DESCRIPTION OF THE PREFERRED EMBODIMENTS

First Exemplary Embodiment

A first exemplary embodiment of the present invention will be described hereinafter by referring to FIG. 1 and FIG. 2.

Figure 1:
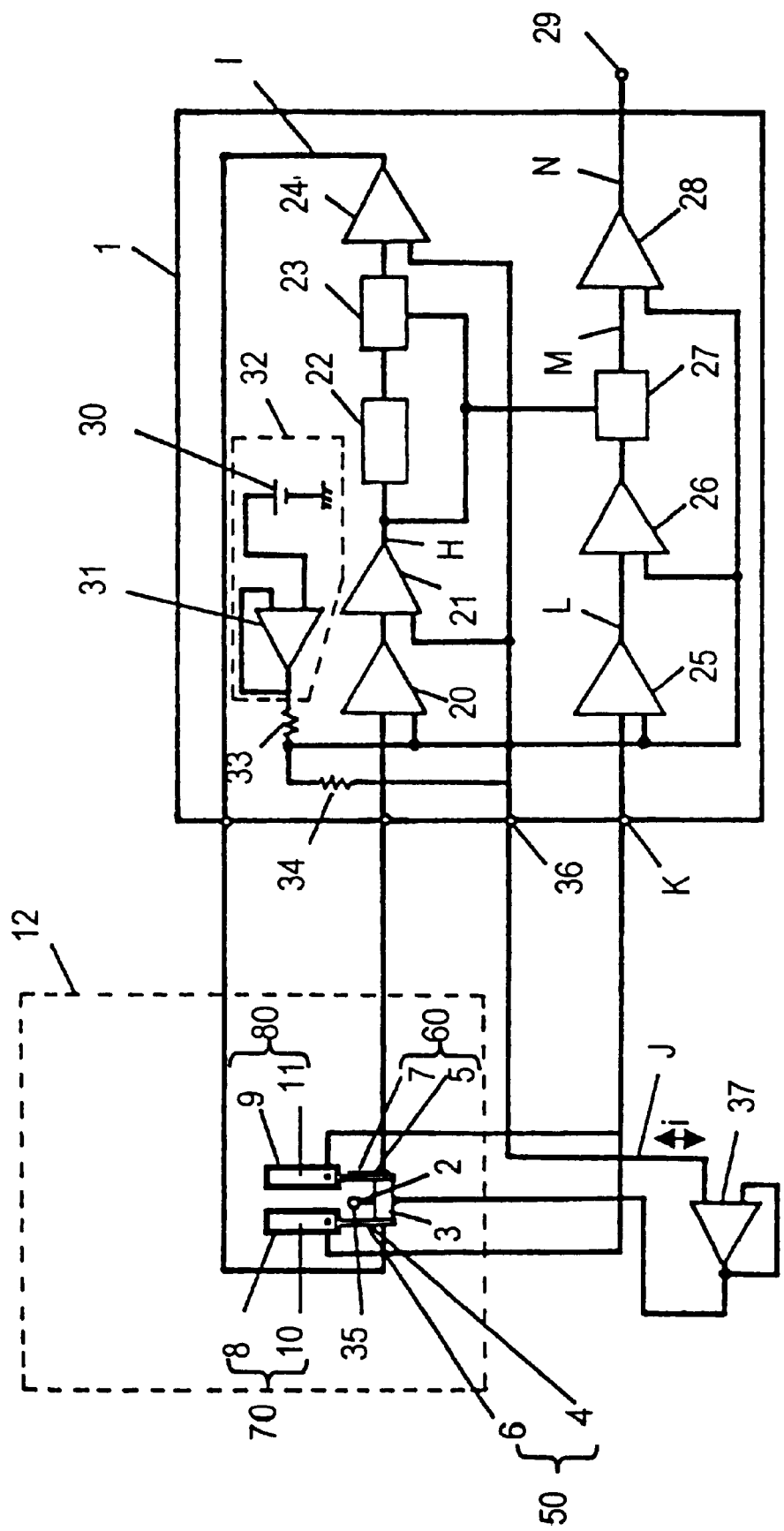
FIG. 1 is a block diagram depicting an exemplary embodiment of an angular rate sensor of the present invention.

FIG. 1 is a block diagram depicting the first exemplary embodiment of an angular rate sensor of the present invention. FIG. 2 is a graphical representation of signal waveforms at various points shown in FIG. 1.

In FIG. 1, a support pin 1 made of metal is press-fitted perpendicularly and secured in a weight plate (not shown in the figure), and one end of another support pin 2 also made of metal is press-fitted and secured in the support pin 1 in an orthogonal direction to it. A block 3 made of metal is fixed to the other end of the support pin 2 by soldering. Vibration plates 4 and 5 are fixed to both ends of the metal block 3. A piezoelectric element 6 is bonded on the vibration plate 4 to constitute a vibration exciter 50, and another piezoelectric element 7 is bonded on the vibration plate 5 to constitute a means 60 for detecting a level of vibrations. A tip of the vibration plate 4 is extended in a manner to form a right angle with the piezoelectric element 6 to become a detecting plate 8. A tip of the vibrating plate 5 is also extended in a manner to form a right angle with the piezoelectric element 7 to become another detecting plate 9. Piezoelectric elements 10 and 11 are bonded respectively on the detecting plates 8 and 9, to constitute detecting means 70 and 80 for detecting a Coriolis' force generated in proportion to an angular rate. An element unit 12 of a tuning-fork type angular rate sensor is completed by having the above components.

Figure 2:
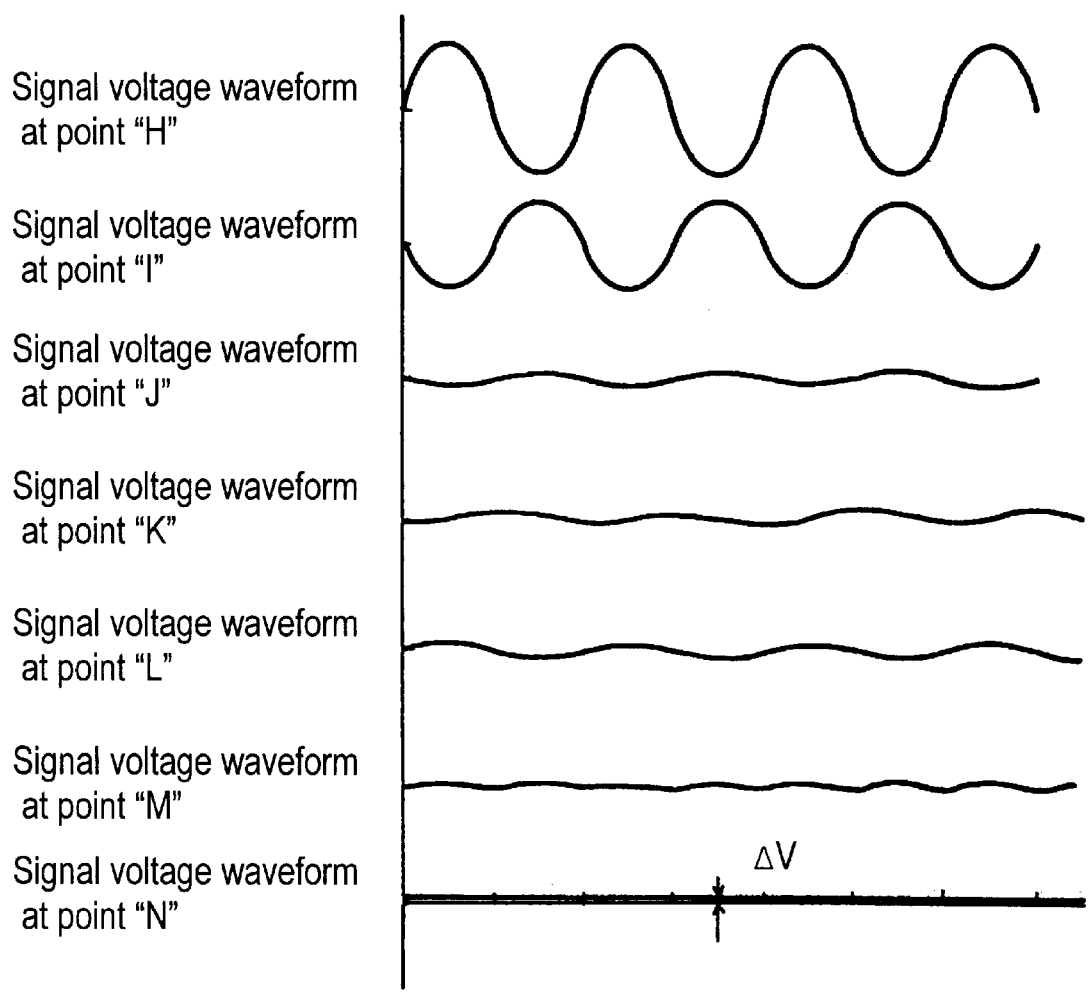
FIG. 2 is a graphical representation of signal waveforms at various points in the same angular rate sensor.
Figure 3:
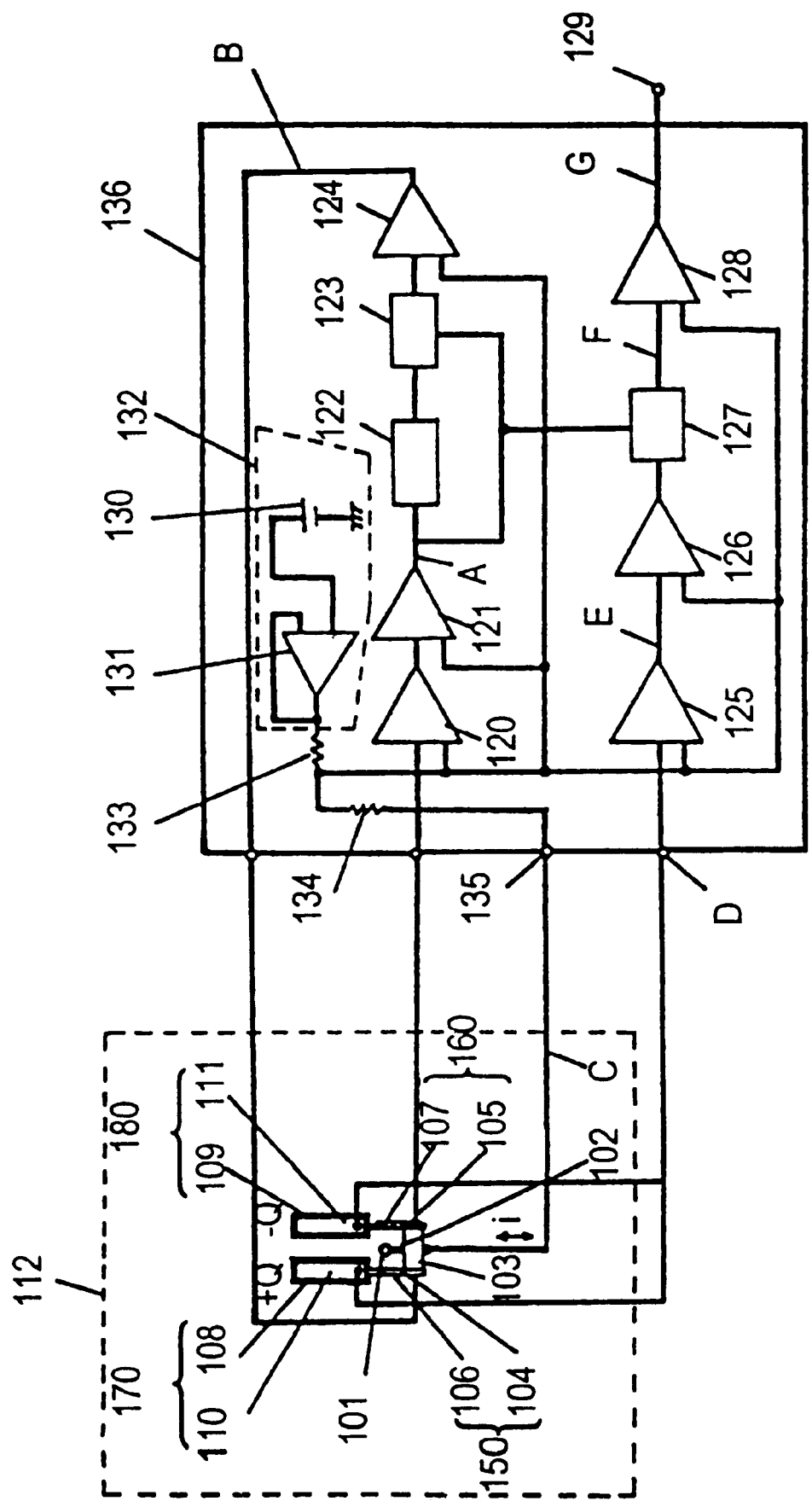
FIG. 3 is a block diagram depicting an angular rate sensor of the prior art.

A structure of FIG. 1 further comprises;

(a) a current amplifier circuit 20 for amplifying an output signal from the piezoelectric element 7 provided on the vibration plate 5 to detect a level of vibrations of the vibration plate 5, which vibrates in a tuning-fork phenomenon in concert with vibrations of the vibration plate 4;

(b) a full-wave rectifier circuit 22 for producing a D.C. voltage by rectifying an output signal (i.e. a signal at a point "H" whose signal voltage waveform is shown in FIG. 2) of a band-pass filter circuit (hereinafter referred to as "BPF circuit") 21, wherein an output signal of the current amplifier circuit 20 is input;

(c) an automatic gain control circuit (hereinafter referred to as "AGC") 23 whose amplification factor for the output signal of the BPF circuit 21 varies according to a magnitude of an output signal of the full-wave rectifier circuit 22;

(d) a driver circuit 24 for driving the piezoelectric element 6 bonded on the vibration plate 4 according to a magnitude of an output signal of the AGC 23 (an output signal of the driver circuit, i.e. a signal at a point "I" has a voltage waveform shown in FIG. 2);

(e) a charge amplifier circuit 25 for inputting and amplifying output signals of the piezoelectric elements 10 and 11, which detect a Coriolis' force generated in proportion to an angular rate;

(f) a synchronous detection circuit 27 for detecting an output signal of a BPF circuit 26, wherein an output signal of the charge amplifier 25 is input; and (g) a sensor output terminal 29 for outputting an output signal of a low-pass filter circuit (hereinafter referred to as "LPF circuit") 28, wherein an output signal of the synchronous detection circuit 27 is input.

In addition, the structure also includes a reference voltage generating means 32 comprising a power supply 30 and a buffer 31. The reference voltage generating means 32 supplies a reference voltage to each of the above-cited circuits through a circuit resistance 33 (let a resistance value be "R3"). A fundamental driving circuit 35 is completed by having the foregoing elements.

Furthermore, a buffer 37 is provided along a connection from the reference voltage generating means 32 in the fundamental driving circuit 35 via the circuit resistance 33, a circuit resistance 34 (let a resistance value be "R4") and a terminal 36 to the support pin 2. The angular rate sensor is completed by including all of the above elements.

The buffer 37 prevents a current flowing in and out of the support pin 2, which serves as a common terminal for the vibration exciter 50, the means 60 for detecting a level of vibrations, and the detecting means 70 and 80 for detecting a Coriolis' force, from flowing in and out of a side of the reference voltage generating means 32.

Therefore, ripple voltage defined by (R1+R2)·i of only a small magnitude is generated in the circuit resistances 33 and 34 (this ripple voltage is observed at a point "J", and a signal voltage waveform of it is shown in FIG. 2). Consequently, only a slight potential difference occurs between the reference voltage input to the individual circuits and the voltage at the support pin 2, thereby resulting in a minute amount of displacement current (this displacement current is observed at a point "K", of which a signal current waveform is shown in FIG. 2) from the piezoelectric elements 10 and 11.

Accordingly, an output signal voltage (FIG. 2 shows a waveform of this output signal voltage, i.e. an output signal at a point "L") from the charge amplifier circuit 25 is also reduced. Hence, respective output signal voltages of the succeeding synchronous detection circuit 27 and the LPF circuit 28 (waveforms of these output signal voltages, i.e. output signals at points "M" and "N" are shown in FIG. 2) are also reduced equally. In other words, an offset voltage ΔV becomes extremely small in the end.

Moreover, a piezoelectric ripple defined by R3·i, as produced in a portion across the circuit resistance 33, also becomes very small, thereby stabilizing the reference voltage input to the individual circuits, and improving operational stability of the circuits.

In the first exemplary embodiment, although what has been described is an example in that the reference voltage is supplied to the individual circuits from a connecting point between the circuit resistances 33 and 34, it can be supplied at any point in the downstream of the circuit resistance 34, since a current flowing through the circuit resistances 33 and 34 is extremely small.

Although what has been described in the first exemplary embodiment is the structure having the buffer provided between the reference voltage generating means for supplying the reference voltage to the individual circuits and the support pin serving as the common terminal, the buffer can be provided between an independent reference voltage generating means prepared for an exclusive use and the support pin serving as the common terminal.

Again, although what has been described in the first exemplary embodiment is only an example in that the element unit of a tuning-fork type angular rate sensor has the structure of the piezoelectric element mounted on the vibration plate, this is not necessarily restrictive. It can be a tuning-fork type vibrating body composed of single-crystal piezoelectric material, poly-crystal piezoelectric material and so on. Furthermore, a vibrating body needs not be limited to the type having a tuning-fork structure of the prior art.

INDUSTRIAL APPLICABILITY

As described above, the present invention provides an angular rate sensor that is capable of restraining an output voltage of the sensor from being offset. This can be achieved by providing a buffer between a reference voltage generating means and a common terminal of a vibration exciter, a means for detecting a level of vibrations and a detecting means for detecting a Coriolis' force, for suppressing a current flowing in and out of the common terminal so as to prevent it from flowing in and out of a side of the reference voltage generating means.

What is claimed is:

1. An angular rate sensor comprising:

(a) a vibration exciter for providing a vibration body with vibrations;

(b) means for detecting a level of vibrations of said vibration body with vibrations;

(c) detecting means for detecting a Coriolis' force produced in proportion to an angular rate;

(d) current amplifier circuit for amplifying an output signal of said means for detecting a level of vibrations;

(e) a full-wave rectifier circuit for producing a D. C. voltage by rectifying an output signal of a first band-pass filter circuit, wherein an output signal of said current amplifier circuit is input;

(f) an automatic gain control circuit whose amplification factor for the output signal of said first band-pass filter circuit varies according to a magnitude of an output signal of said full-wave rectifier circuit;

(g) a driver circuit for driving said vibration exciter according to a magnitude of an output signal of said automatic gain control circuit;

(h) a charge amplifier circuit for inputting and amplifying a signal detected by said detecting means for detecting a Coriolis' force;

(i) a synchronous detection circuit for detecting an output signal of a second band-pass filter circuit, wherein an output signal of said charge amplifier circuit is input;

(j) a sensor output terminal for outputting an output signal of a low-pass filter circuit, wherein an output signal of said synchronous detection circuit is input;

(k) a reference voltage generator; and (l) a buffer provided between said reference voltage generator and a common terminal for said vibration exciter, said means for detecting a level of vibrations and said detecting means for detecting a Coriolis' force, for suppressing a current flowing in and out of said common terminal so as to prevent the current from flowing in and out of a side of said reference voltage generator.

2. The angular rate sensor according to claim 1, wherein said reference voltage input to said buffer is an output voltage of said reference voltage generating means for supplying a reference voltage to each of said circuits.

* * * * *